INVENTORS
Thomas C. Burnett
Martin M. Y. Chang

INVENTORS
Thomas C. Burnett
Martin M.Y. Chap

United States Patent Office 3,497,886
Patented Mar. 3, 1970

3,497,886
MOLD HULL STRUCTURE AND DEVICE
OF MAKING SAME
Thomas Clarence Burnett, Hawkesbury, Ontario (R.R. 3, Peterborough, Ontario, Canada), and Martin Ming Yang Chang, 485 Allan St., Hawkesbury, Ontario, Canada
Filed Oct. 4, 1967, Ser. No. 674,379
Int. Cl. B63b 7/08
U.S. Cl. 9—6                    15 Claims

ABSTRACT OF THE DISCLOSURE

This invention relates to a method of molding plastic boat hull structure whereby said hull structure is molded with a flexible and pneumatically inflatable molding complex. This molding complex consists of a pair of parallel impermeable and substantially inextensible membranes, said parallel relationship being maintained during inflation by means of virtually inextensible yarns attached between membranes. The volume so defined is the molding space into which a curable plastic resin is introduced. Further to this molding space, the complex has another membrane system formed by extending the inner membrane into a closed volume defining an inflation chamber which is to be filled with air to impart to the complex the necessary shape and structural rigidity required for the molding process. This closed portion of membrane is removed after the plastic has cured leaving the remainder of the parallel membranes and the yarns intimately bonded to the solid plastic.

---

Further embodiments of the invention allow for the manufacture of a variety of hull shapes such as flat-bottomed, or with a flat transom as well as reinforcing partitions, hardware and sea attachment points, and a shock absorbing bumper strip.

The construction of a sailing and conveying vessel such as a boat or ship is largely the assembly of small elemental sections into a large body structure. This assembly work increases the total construction cost of a ship. Fiber glass boat or injection molded vessels have been introduced in recent years, but these require either skillfull technique or heavy equipment (such as a large solid mold) which makes them impractical for the amateur boat builders. For example, Bellance et al., U.S. Patent 3,078,202, requires the use of relatively rigid internal and external shells to provide a molding space into which the plastic material can be introduced. In many cases, a rigid outer molding form must be used. See FIGURES 14 to 24 of the text of the said patent. The U.S. Patent 3,061,492 issued to Singleton et al. discloses a laminated shell structure which also involves the use of a rigid form for the laminated structure to be deposited onto before the liquid polyester can be allowed to harden. In U.S. Patent 2,815,309, Ganahl et al. disclose a molding method for boat construction which also requires the use of a solid form made into the shape conforming to the interior shape of the boat. Without the use of solid forms in one way or another, none of the above mentioned techniques could be executed.

We have found that it is possible to overcome the above mentioned inconveniences of boat construction by introducing a prefabricated pneumatic flexible molding complex and an "injection and inflation" technique for a chemical molding process to make the basic shell or hull structure of a boat. The flexible molding complex is made of strong plastic material which consists of an inflation chamber, and an injection chamber or chambers. The inflation chamber of the mold is made in a simple geometric shape and is adapted to be filled with a chemically inert or inactive fluid such as air, to produce the basic shape of the boat. The injection chamber is adapted to be filled with liquid plastic in which the latter will set or harden to provide the major structural strength of the boat. This flexible molding complex can be prefabricated in a factory and distributed to the private or amateur boat builders. The liquid plastic can also be premixed and stored in a suitable container ready for use on the site of the final construction of the boat. This final construction of the boat on the site is then reduced to a very minor quantity of work, mainly "inflation and injection," and therefore provides a great convenience for amateur boat builders.

In the drawings which illustrate different embodiments of the invention:

Figure 3:
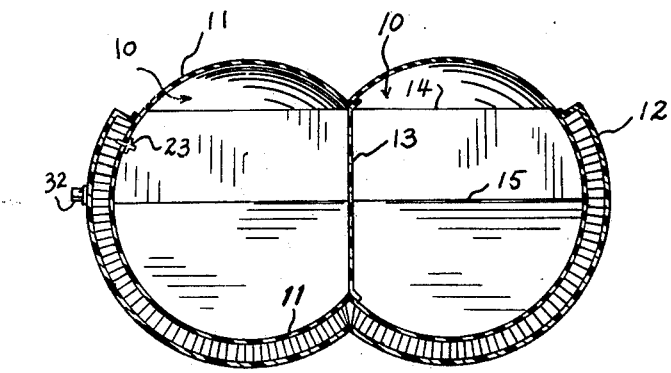
FIGURE 3 is a section at II—II of FIGURE 1, with FIGURE 3A, showing the enlarged parts of this figure.
Figure 1:
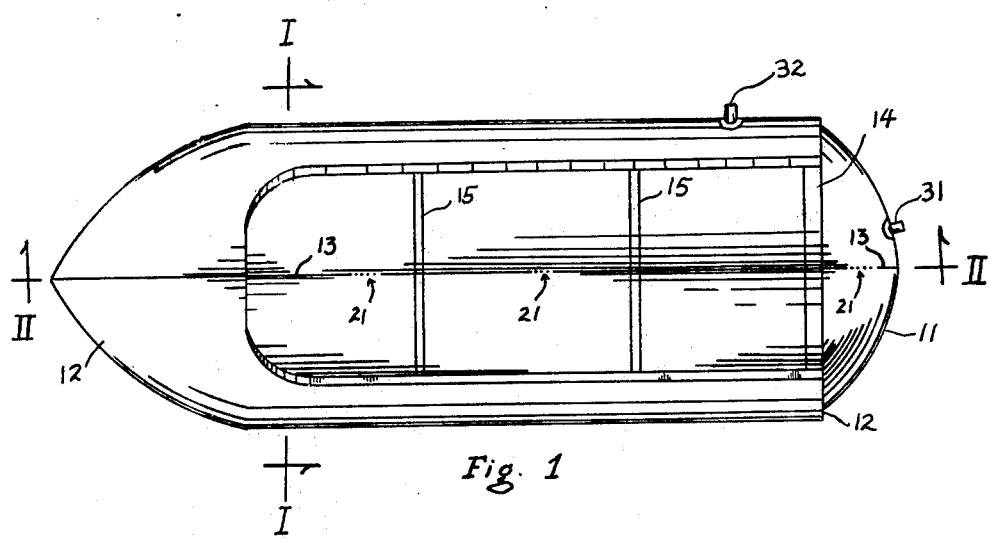
FIGURE 1 is the top view of one of the embodiments of which the inflation chamber is in the shape of a parallel and overlapping cylinder.
Figure 2:
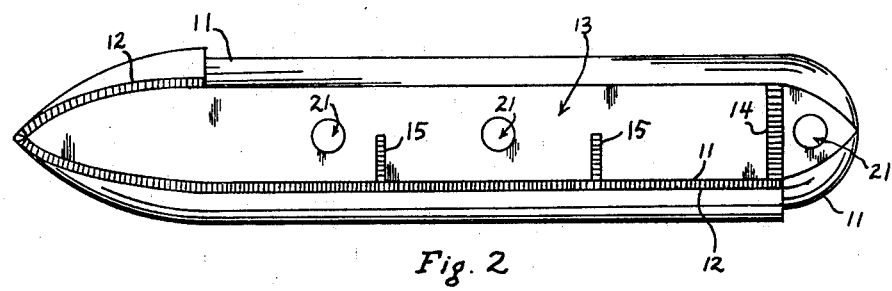
FIGURE 2 is the side view of a section at I—I of FIGURE 1, with FIGURES 2A and 2B showing the enlarged parts of the embodiment.

On one of the embodiments of this invention as illustrated in FIGURES 1 through 3, the flexible and inflatable chamber 10 of the molding complex designed for a small boat comprises of a first membrane 11 made of a flexible, inextensible and impermeable material such as resin impregnated fiber glass cloth, constructed in such a way as to enclose a predetermind geometric space such as a cylinder on inflation by air. Over certain portions of the outside skin of the inflatable chamber membrane 11 is attached a second membrane 12 of same material as membrane 11. A plurality of perpendicular yarns or drop threads 20 made of a flexible and substantially inextensible material such as nylon thread whose length determines the separation of membrane 11 to 12, are connected between these two membranes 11 and 12. The inter-relationship between the yarns and the membranes is well defined as fabric structure in the art of air mattress manufacture, for example, U.S. Patents 3,185,506 and 3,205,106. In addition, these yarns could also be made of narrow strips of fiber glass cloth, attached to the membranes by the resin used to impregnate the membranes. The space enclosed between the first and the second membranes 11 and 12 is defined as the molding space 30 which is designed for a liquid plastic to be introduced and set therein. Due to the presence of the plurality of yarns, the molding space 30 will generally obtain a uniform thickness determined by the length of the yarns when it is filled with a fluid. Since the shape of the inflation chamber 10 is produced by filling the chamber with a pressurized air, only simple geometrical shapes can be formed such as a cylinder. Nevertheless, some more complex shapes can still be made possible by one way or the other. For example, shown in FIGURE 1–3 is a hull structure in the shape of two overlapping cylinders made using of a central interpartition strip 13 connected to the center axes throughout the length of the cylinder. The width of the strip is small as compared to the diameter of the chamber enclosed by the membrane 11 so that when the chamber space 10 is inflated it will produce the shape of overlapping cylinders as shown in FIGURES 2 and 3. Openings 21, referring to FIGURE 2, on the partition strip 13 are provided to connect the two halfs of the chamber spaces divided by the partition strip so that an equal air pressure in both chamber spaces is obtained. Valve means 31 is also provided on the chamber membrane 11 for the inflation purpose. A second valve means 32 is provided on membrane 12 for the injection of the plastic into the molding space 30 which will then form with the solidified plastic therein the body shell of the designated hull structure.

Figure 2A:
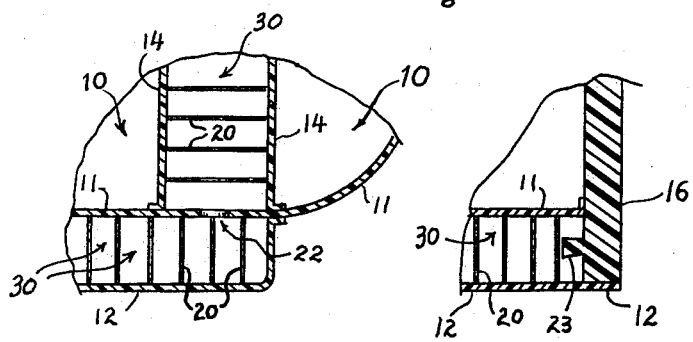

A flat transom portion for the boat can be made as shown in FIGURE 1, with the sectional view shown in FIGURE 2 and an enlarged rear section in FIGURE 2A. Here the jacket structure 14 constituting the transom comprises a double layered fabric structure and is placed inside the inflation chamber 10. The two opposite membranes of this fabric 14 are inter-connected perpendicularly with a plurality of yarns or strips of equal length as that of the Ross patent. These membranes 14 are closed up along the top edge of the transom and sealed thereof. Also sealed are the outermost edges of the transom fabric 14 where they meet the rear end of the body of the boat, as shown in FIGURE 2A. A series of tiny openings 22 whose diameters are small compared to the length of the perpendicular yarns 20, i.e., the thickness of the transom along the junction area of the transom 14 and the membrane 11 is specially provided. These openings 22 allow the space 30 inside the jacket structure 14 to be interconnected to the molding space 30 of the hull structure. Therefore upon injection of plastic to the molding complex, the transom will be firmly secured to the body portion of the boat through the plastic solidified in these openings.

Some vertical reinforcing partitions in the cross direction can also be fitted to the designated boat in the likewise manner as that of the flat transom. The double membrane structures 15 with internal yarns are placed within the chamber membrane 11 and pasted at the appropriate edges to the latter. The molding space within the double membrane 15 is sealed off from the chamber space and is interconnected to the molding space of the body structure by means of some openings in the same way as that in the transom. Since the air pressure within the chamber space 10 during the inflation is universally isobaric, the only force acting on the liquid plastic when injected into the vertical partition membranes 15 will be the gravity only and this is supported by the bottom immediately below. Therefore this partition when filled with plastic will be able to maintain a vertical and straight form to allow the plastic to harden and set therein.

Figure 3A:
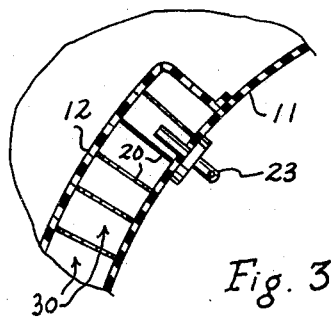

Accessories such as hooks or lugs 23 can be fitted to the molding complex at appropriate places. As shown in FIGURE 3A, the hook 23 is pasted at its middle section onto the surface of membrane 11 with one end extending into the molding space between the membranes 11 and 12. When the liquid plastic is filled in this molding space and solidified, the corresponding hook will be firmly clamped in the matrix of the solid plastic. Other small parts like lugs for attaching seats to the reinforcing partition can also be attached in the similar manner.

The flexible molding complex thus constructed can be examined for leaks and construction errors such as loose interconnecting strips by inflating both chamber space and molding space with compressed air or water to produce their desired shape. Any leakage or imperfection can be corrected at this stage.

After this, air or water in both spaces will be evacuated from the mold and the collapsed mold can be folded and packaged into a very small carton ready for storage or shipment. This article can now be sold to the amateur boat builder as a "do-it-yourself" boat kit.

The boat is completely constructed by a final molding process using the above specified molding complex and injecting the required inert fluid and liquid plastic into the respective spaces via the specific valve means provided with the molding complex. Thus the inert fluid, such as compressed air, is injected into the inflation chamber through valve 31 until a finite pressure is built up. This pressure should be at least equal to or greater than the total weight of the mold when filled up with liquid plastics divided by the projected horizontal cross-sectional area of the boat. This pressure should also be maintained at the same level throughout the course of injection and hardening of the liquid plastic. The injection with liquid plastic, via valve 32, can be done either before, at the same time, or after the inflation with compressed air. The injection pressure should in all cases be larger than the air pressure in the chamber space to facilitate the entrance of the liquid material into those portions such as the vertical partitions or flat transom, if any. Depending on the size of the total molding space, the capacity of the injection machinery, and the viscosity of the liquid plastic employed, the time required for this operation may vary from a fraction of an our to several hours. The composition of the plastic material must therefore be prepared so as to give a sufficiently low rate of solidification to ensure a complete filling of the molding spaces for a good finish and body strength. Nevertheless, this liquid plastic used according to the present invention can be any pre-mixed polymer composition hardenable at room temperature and atmospheric pressure, such as the well-known polyurethane or epoxy resins. Some other chemical composition which is in a flowable plastic state under high pressure and can be solidified after being released from the pressurized storage container, can also be used. In the latter case, the composition is released from the pressurized bottle to the valves 32 of the molding membrane and readily flows into the empty molding space.

When the liquid plastics filling the molding space is completely soldified, the compressed air or other fluid in the chamber space can be withdrawn from valve 31. A portion of the chamber membrane 11 which does not form a double layered structure with the second membrane 12 will collapse into the hull of the boat. This and the partition strip 13 can be cut away from the solid hull. The remaining portions of membranes 11 and 12, together with the plurality of connected yarns between them, are bonded firmly into the solidified plastic matrix and are now the hull structure of the boat. The space which has been termed the chamber space enclosed solely by membrane 11 is now the available cargo space of the vehicle. Thus a basic shell structure for the boat is produced. Other further equipment can now be attached to the vehicle, the detail of which is beyond the scope of the present invention and will not be discussed further.

It is inherently apparent from the construction technique described in this invention that the two membranes 11 and 12 now form the inner and outer skin of the finished structure. The painting, any other decorative lettering, etc. can be applied to the two membranes of the molding complex during its manufacture in the factory. This practice, of course, reduces further the labour involved in the boat finishing.

According to this invention, the finished boat basically consists of a sandwich-like structural hull body having an outer and an inner layer of impermeable membranes and sandwiched within these membranes, a relatively thick layer of plastic material which is solid and constitutes the main structural strength of this sandwich structure. Supplementary to the solid material, a plurality of parallel yarns connected perpendicular to the opposite membranes are imbedded within the matrix of the solid plastics. This yarn and membrane combination forms an additional network structure which provides the mechanical strength of the solid plastic. The finished structure has therefore a combined strength from both the extended network structure of the molding complex and the solid mass of the injected plastics. Even in conventional fibre glass boat construction, reinforcing strips or filaments normal to the hull structure cannot be installed as is possible with this invention.

Another novel feature disclosed in the present invention is that the molded object acquires its shape through the use of a flexible molding structure, i.e. the so-called molding complex. Rigid forms are not needed during the field construction of the hull structure. The overall shape of the molded object is obtained through the inflation of the inner chamber of the flexible mold. The molding space, confined by the first and second membranes, follows the curvature or contour of the inflated first membrane and therefore acquires a predetermined curvature. Liquid plastic injected and hardened therein will therefore adopt the overall shape of the inflated chamber. Furthermore, with the assistance of drop threads, this hardened plastic structure will be of relatively uniform thickness between the two membranes 11 and 12 of the flexible molding complex. The inner space enclosed by the first membrane will then become the cargo space of the boat after the spare portion of the membrane 11 is removed upon the completion of the construction.

Figure 2B:
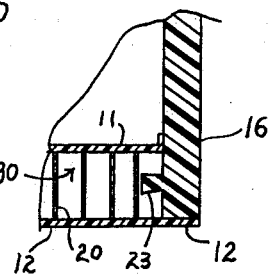

Referring to FIGURE 2B, solid pieces of material for the molding complex are introduced. Here shown is a corner of the sectioned rear end of the molding complex whereby the flat portion 14 of the molding complex as shown in FIGURE 2, is replaced by a piece of solid material 16 such as wood board preformed into the required shape such as the transom, of the designated boat structure. Along the appropriate outermost edge of the transom 16 where the molding space of the flexible mold meets the transom, the second membrane 12 is terminated and pasted securely thereto. The rear edge of the first or chamber membrane 11 is terminated and pasted to that line at the transom 16 and is separated from the second membrane 12 by a distance at least equal to the length of the yarns 20 extending between these two membranes. A series of small lugs 23 can be attached to the flat transom and extend into the molding space 30, i.e. the space between the chamber and membranes 11 and 12. These lugs will result in firm attachment between the flat end 16 and the finished body structure when injected liquid plastic in the latter has solidified. Any flat portion of the molding complex can be replaced with solid material in a similar manner. This combined flexible and solid molding complex simplifies the structure of the mold. For example, the extended rear portion of the first membrane 11 beyond the transom (rear in FIGURE 2A) is therefore no longer necessary, and is eliminated by the introduction of this preformed solid transom. However, this combination still preserves the advantage of a flexible mold, such as the saving of packing space of the mold, because almost all flat portions of a boat such as the transom and reinforcing transverse pieces, are of relatively small size compared to the hull structure itself.

A further embodiment of the invention is hereby disclosed by which an independent fabric unit for the molding space is employed in the flexible molding complex. This independent fabric unit, herewith called a molding jacket or fabric structure, such as that known as "Airmat" available from Goodyear Tire and Rubber Co., consists of two layers of flexible and impermeable membrane material attached together by a plurality of inextensible yarns of equal length and in a perpendicular relationship to the corresponding membranes. This jacket structure is made into a large envelope following closely the contour of the inflated interior chamber. Along the edge of the envelope the first and second layers of the fabric structure are sealed together to form an isolated space within the fabric structure. This jacket structure is then temporarily glue to the outside skin 11 of the inflatable chamber to cover that surface where the designated hull body is to be formed. The inflation chamber 11 is a bag-like structure which will take on a predetermined shape when filled with compressed air and therefore will support the molding jacket in this predetermined or inflated shape. Valve means 32 are also provided to the molding jacket for the injection of liquid plastics into its molding space enclosed solely between the two skins of the jacket structure itself. After solidification of the plastic material in this space, the inflation chamber can be deflated, removed, and re-used in further molding operations.

Figure 4:
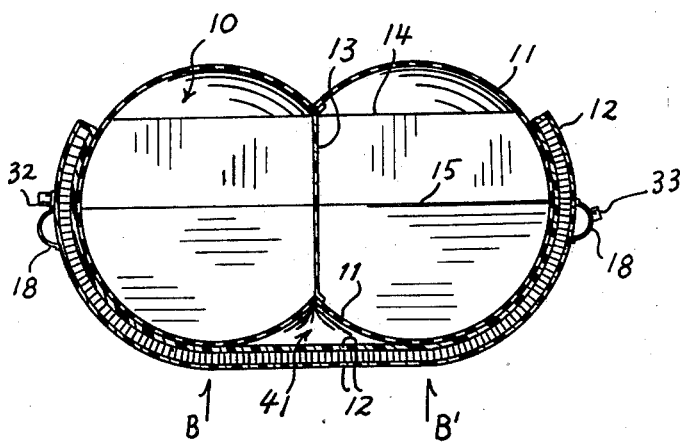
FIGURE 4 is another section similar to FIGURE 3, but showing an additional air space and membrane arrangement so that a flat-bottomed boat can be made.

A further advantage of the independent molding jacket structure is illustrated in FIGURE 4. As illustrated, the molding jacket 12 is generally covering and following the inflated shape of the chamber membrane 11, except in the bottom portion. A flat piece for the bottom portion of the boat can therefore be made provided the floor on which the moding complex has been placed during injection construction is flat. The double layered molding jacket 12 at the bottom portion from B to B' of FIGURE 4 is made as wide as the projected width of the appropriate portion of the inflation chamber 11 and is not glued to the latter. The space 41 between the inflation chamber and the molding jacket is opened, through an additional valve not shown in this figure, to the outside atmosphere. As the chamber space is inflated with compressed air and erected to its scheduled twin tubular shape, the space 41 will still have the same pressure as the outside atmosphere which is smaller than the inflation pressure in the chamber space 10. Therefore, the presence of space 41 does not change or distort the desired shape of the inflation chamber 11. However, the liquid plastic in this bottom portion B–B' of the molding jacket is subjected to the gravitational field and will therefore stay on the floor and remain in this flat shape throughout the course of solidification of the injected chemicals. When this chemical is completely solidified and the chamber membrane is withdrawn from the solid structure, a flat bottom for the boat is obtained.

Also shown in FIGURE 4 is another embodiment whereby a bumper strip along the outermost edge of the hull structure of the boat can be made. A membrane 18 is provided to cover the parts where the bumper strip is desired. This membrane can be of the same material as the membrane 11 and can be positioned to extend over the entire length of the corresponding strip. The space defined thereby, between the membrane 18 and the molding jacket 12 may then be injected with a premixed material to form, after solidification of the latter, a bumper and reinforcing structure for the hull. Valve means 33 for the injection of this bumper space should of course be provided on this strip membrane 18. A pressurized material which will set to give an elastic mass will be especially suitable as the injection material for the bumper strip. Furthermore, places wherever a reinforcement is required can also be strengthed in a similar manner.

It will be readily appreciated from the foregoing description that here is provided a novel, conveniently constructed, inexpensive boat structure, especially suitable for "do-it-yourself" amateur boat builders. As the flexible form or so-called "molding complex" and the injection chemicals can be prefabricated in a manufacturing factory and sold in kit form, the complicated technical problems of conventional boat construction is therefore resolved. In addition, this novel molding technique may be advantageous to the limited production of a variety of boat shapes since these flexible molds can be more easily modified than the costly fixed or solid molds.

We claim:
1. A method for the construction of a conveying shell structure such as a boat hull comprising: first producing a flexible mold made of a first layer of a flexible, inextensible and impermeable fabric membrane defining a first inner chamber and a second layer of same membrane material defining, with the corresponding portions of the first membrane, a second isolated jacket space, said second layer of membrane being connected to the first membrane by a plurality of inextensible yarns in a parallel spaced relationship; then inflating said inner chamber space with a pressurized fluid to produce a simple geometric shape of same; followed by injecting a premixed liquid material capable of solidifying in the closed space of the second jacket; then allowing said injected fluid to set therein to obtain a rigid structure for the conveying shell structure.

2. A method for constructing a conveying structure as claimed in claim 1, in which said pressurized fluid comprises compressed air and said premixed liquid material consists of liquid plastics or resins such as polyester resin.

3. A method for constructing a conveying shell structure as claimed in claim 1, whereby the injection of said premixed liquid is performed at the same time of the inflation of pressurized fluid into said first inner chamber.

4. A method for constructing a conveying shell structure as claimed in claim 1 in which said premixed liquid comprises a plastic which is in a flowable state under high pressure and will solidify gradually when injected into the molding space whereby a relatively reduced pressure is exerted.

5. A flexible molding combination applicable for the construction of conveying vehicles comprising: an inner membrane of flexible, impermeable and substantially inextensible material forming an envelope isolated from the outside atmosphere which takes on a predetermined simple geometrical space when pressurized; an outer membrane of flexible, impermeable and substantially inextensible material following at least in part the curved shape of said inner membrane and enclosing therein an isolated space which can be filled with a fluid capable of solidifying in this space; a plurality of yarns of practically inextensible material interconnecting said outer membrane, in parallel spacing relationship, with said inner membrane; said space for filling with fluid capable of solidification defining substantially the body of the hull structure of the designated conveying vehicle; and valve means, between said geometrical space defined by said inner membrane and the outside atmosphere and between said filling space and the outside atmosphere, respectively, being provided for inflating and deflating of said geometrical space and for injecting into said filling space a premixed material capable of solidifying therein.

6. A flexible molding combination as claimed in claim 5, in which at least one interpartition strip of a flexible and inextensible material extending through the length of said hull structure connected across at least one diameter of said inner membrane; the width of said strip being small compared to said diameter so that on inflation of said inner membrane, said envelope will take on a shape like that of overlapping cylinders.

7. A molding combination as claimed in claim 5, of which said filling space is enclosed by a double layered fabric of flexible, inextensible and impermeable material independent of said inner membrane but at least in part covering and following the shape of same; the layers of said double layered fabric being interconnected into a parallel relationship by means of said plurality of yarns which are of equal length and secured at least temporarily onto a portion of the outer circumference of said inner membrane therefore allowing the removal of said inner membrane from the finished hull structure.

8. A molding combination as claimed in claim 7, in which said double layered fabric is connected at the rear end of the designated hull structure, to a vertical section of same double layered fabric forming the transom of said shell structure in such a way that by filling with a fluid which will harden, a flat rear end for the hull structure can be provided.

9. A flexible molding combination as claimed in claim 8 whereby at least one portion of same double layered fabric is installed in a vertical position within said inner membrane; said fabric, upon completion of filling a fluid which will harden, forming a vertical supporting partition for the designated hull structure.

10. A foldable molding combination as claimed in claim 7 whereby at least a portion of the hull structure, such as the transom, comprises a solid and relatively rigid material, such as wood, whose edges are sealed to the appropriate edges of said double layered fabric and said inner membrane so that on completion of the solidification of a filled fluid within the space enclosed by the double layered fabric and said portion will remain as part of the constructed hull structure.

11. A foldable molding complex as claimed in claim 10, in which a series of serrated studs are provided along the appropriate edges of said portion and extend into the space enclosed between said double layered fabric where said portion is attached to the fabric, to ensure a secure attachment of the molded hull structure to said portion on completion with injected material in said enclosed space thereof.

12. A substantially flexible molding combination for the construction of a hull structure as claimed in claim 5, whereby appropriate accessories such as hooks are mounted onto the surface of said flexible mold, said accessories having serrated rods extending into the inner space of said double layered fabric so as to be bonded into the matrix of a solid mass upon the solidification of the filled fluid therein.

13. A foldable molding combination as claimed in claim 7, in which a portion of said double layered fabric corresponding to the bottom portion of the designated hull structure is detached from the corresponding portion of said inner membrane so that on inflation of said inner membrane said bottom portion of the double layered fabric does not follow the contour of the inflated inner membrane and therefore takes on the shape of the surface where the mold is supported, and thus said hull structure is furnished with a flat bottom.

14. A flexible molding combination as claimed in claim 7, of which the outer membrane of said mold is impregnated with suitable coloured matter and decorative finish so that after solidification of the injected fluid and the removal of the inner chamber the hull structure is substantially finished.

15. A flexible complex as claimed in claim 7, of which a strip of flexible and impermeable membrane is sealed on the outer membrane of the molding complex along a longitudinal circumference of said double layered fabric; the width of said strip being larger than the distance between its attachment, so that on filling the space thereto enclosed with liquid and hardenable plastic, a strip of plastic material will result for the reinforcing and shock protection of said hull structure.

References Cited

UNITED STATES PATENTS

| | | | |
|---|---|---|---|
| 2,815,309 | 12/1957 | Ganahl et al. | 9—6 X |
| 2,956,292 | 10/1960 | Newsome | 9—6 |
| 3,061,492 | 10/1962 | Singleton et al. | 9—6 X |
| 3,078,202 | 2/1963 | Bellanca et al. | 9—6 X |
| 3,138,506 | 6/1964 | Ross | 156—156 |
| 3,150,386 | 9/1964 | Bastien | 9—6 |
| 3,161,553 | 12/1964 | Visser | 156—156 |
| 3,205,106 | 9/1965 | Cross | 161—98 X |

TRYGVE M. BLIX, Primary Examiner

U.S. Cl. X.R.

156—156; 161—98, 123, 127